United States Patent
Anderson et al.

(10) Patent No.: US 6,877,273 B2
(45) Date of Patent: Apr. 12, 2005

(54) ARTICLE RETRIEVING TOOL

(75) Inventors: Rebecca J. Anderson, Denver, CO (US); Douglas J. Golenz, Louisville, CO (US); Daniel J. Tarala, Denver, CO (US)

(73) Assignee: Slapper Wrapper, Inc., Denver, CO (US)

( * ) Notice: Subject to any disclaimer, the term of this patent is extended or adjusted under 35 U.S.C. 154(b) by 0 days.

(21) Appl. No.: 10/248,365

(22) Filed: Jan. 14, 2003

(65) Prior Publication Data

US 2003/0159334 A1 Aug. 28, 2003

Related U.S. Application Data

(63) Continuation-in-part of application No. 10/083,742, filed on Feb. 27, 2002, now Pat. No. 6,564,505.

(51) Int. Cl.[7] .............................................. A01M 3/04
(52) U.S. Cl. ........................................................ 43/136
(58) Field of Search ........................ 43/136, 134, 132, 43/135, 137, 115; 89/484, 480; 7/108

(56) References Cited

U.S. PATENT DOCUMENTS

| | | | | |
|---|---|---|---|---|
| 382,580 A | * | 5/1888 | Wilmot ....................... 43/136 |
| 537,660 A | | 4/1895 | Wood |
| 834,039 A | | 10/1906 | Bailey |
| 884,213 A | | 4/1908 | Schmidt |
| 1,081,364 A | * | 12/1913 | Chapman .................... 43/137 |
| 1,102,829 A | * | 7/1914 | Walker ........................ 43/136 |
| 1,195,986 A | * | 8/1916 | Harrison ..................... 43/136 |
| 1,237,081 A | | 8/1917 | Mott, Jr. |
| 1,631,864 A | * | 6/1927 | Hendrickson et al. ........ 43/137 |
| 1,706,516 A | * | 3/1929 | Bennett ....................... 99/402 |
| 1,802,774 A | | 4/1931 | Nixon |
| 2,279,809 A | | 4/1942 | Apfel .......................... 294/11 |
| 2,469,865 A | | 5/1949 | Crow .......................... 294/104 |
| 2,545,215 A | * | 3/1951 | Sharpe ........................ 43/137 |
| 2,736,129 A | | 2/1956 | Roop .......................... 43/137 |
| 2,759,758 A | | 8/1956 | Yancey ........................ 294/104 |
| 2,963,816 A | | 12/1960 | De Miller .................... 43/137 |
| 3,191,339 A | * | 6/1965 | Dougherty ................... 43/137 |
| 3,412,501 A | * | 11/1968 | Rosen ......................... 43/137 |
| 3,463,244 A | | 8/1969 | Mc Fadden ................. 172/378 |
| 3,937,512 A | | 2/1976 | Baughman ................... 294/19 |
| 4,120,114 A | * | 10/1978 | Little et al. .................. 43/137 |
| 4,617,754 A | * | 10/1986 | Miley .......................... 43/137 |
| 4,653,222 A | | 3/1987 | Viscosi ........................ 43/137 |
| 4,653,789 A | | 3/1987 | Mc Williams et al. ....... 294/1.1 |
| 4,759,150 A | | 7/1988 | Pierce ......................... 43/136 |
| 4,850,133 A | * | 7/1989 | Burzdak et al. ............. 43/136 |
| 4,905,408 A | * | 3/1990 | Wu ............................ 43/137 |
| 5,095,648 A | | 3/1992 | Keenan ....................... 43/136 |
| 5,630,290 A | | 5/1997 | Wade et al. ................. 43/136 |
| 5,634,293 A | | 6/1997 | Mike et al. .................. 43/136 |
| D401,304 S | | 11/1998 | Hawkins ..................... D22/124 |
| 6,044,584 A | * | 4/2000 | Lynn .......................... 43/136 |
| 6,055,767 A | | 5/2000 | Carter ......................... 43/137 |
| 6,065,787 A | | 5/2000 | Jarosch ....................... 294/19.1 |
| 6,067,746 A | * | 5/2000 | Kistner et al. ............... 43/136 |
| 6,185,862 B1 | | 2/2001 | Nelson ........................ 43/136 |

\* cited by examiner

*Primary Examiner*—Teri P. Luu
*Assistant Examiner*—Jordan Lofdahl
(74) *Attorney, Agent, or Firm*—Roger A. Jackson

(57) ABSTRACT

A preferred tool for killing insects and lifting small objects has a tool, an upper handle part (10); a lower handle part (12), a tool extension base (15); attached to a tool extension (14); by some form of hinge (16). A control rod (11) attaches, at one end, to the tool extension and to a positioner (13) on the other. The control rod (11) is positioned within the handle parts (10 and 12). A pad (45) with adhesive faced sheets (48) is attachable to the tool head formed by the tool extension base and extensions. In other models, the handle (51 and 65) is formed of a single part.

12 Claims, 5 Drawing Sheets

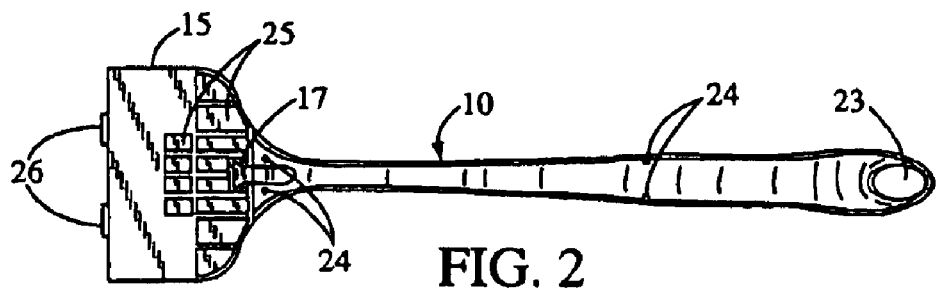
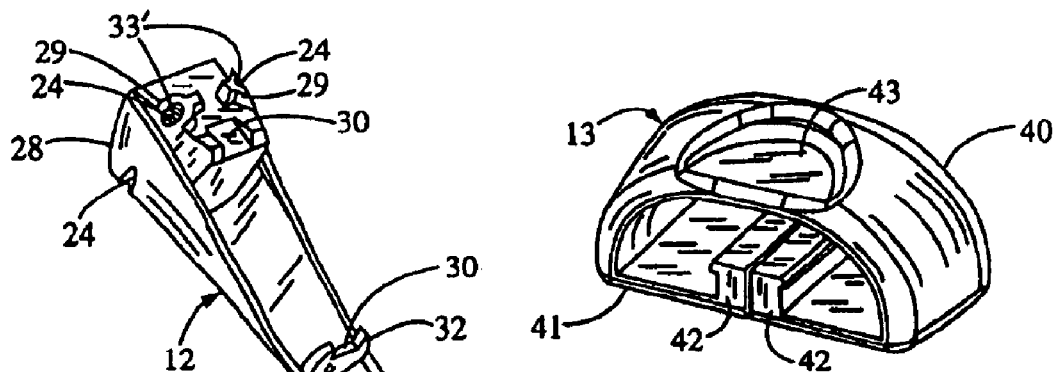
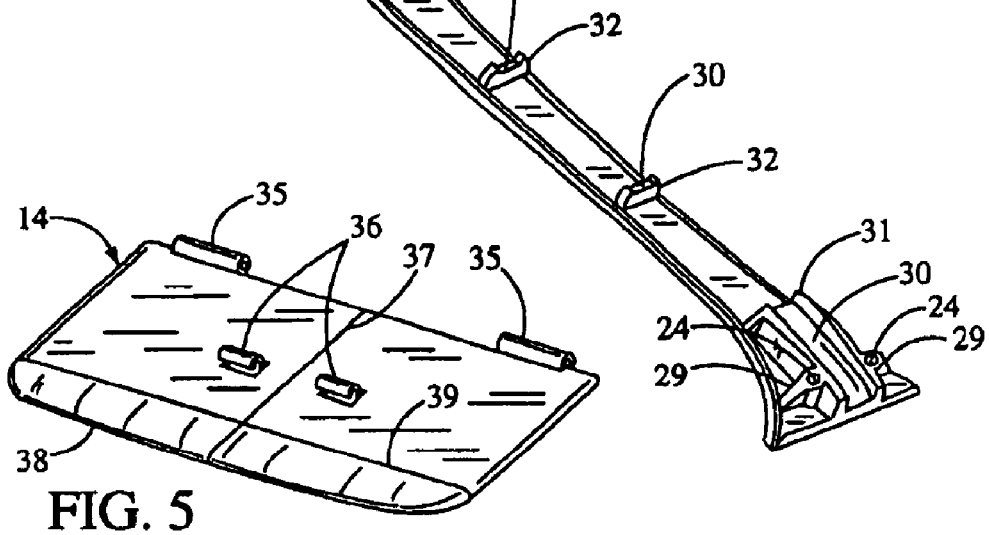

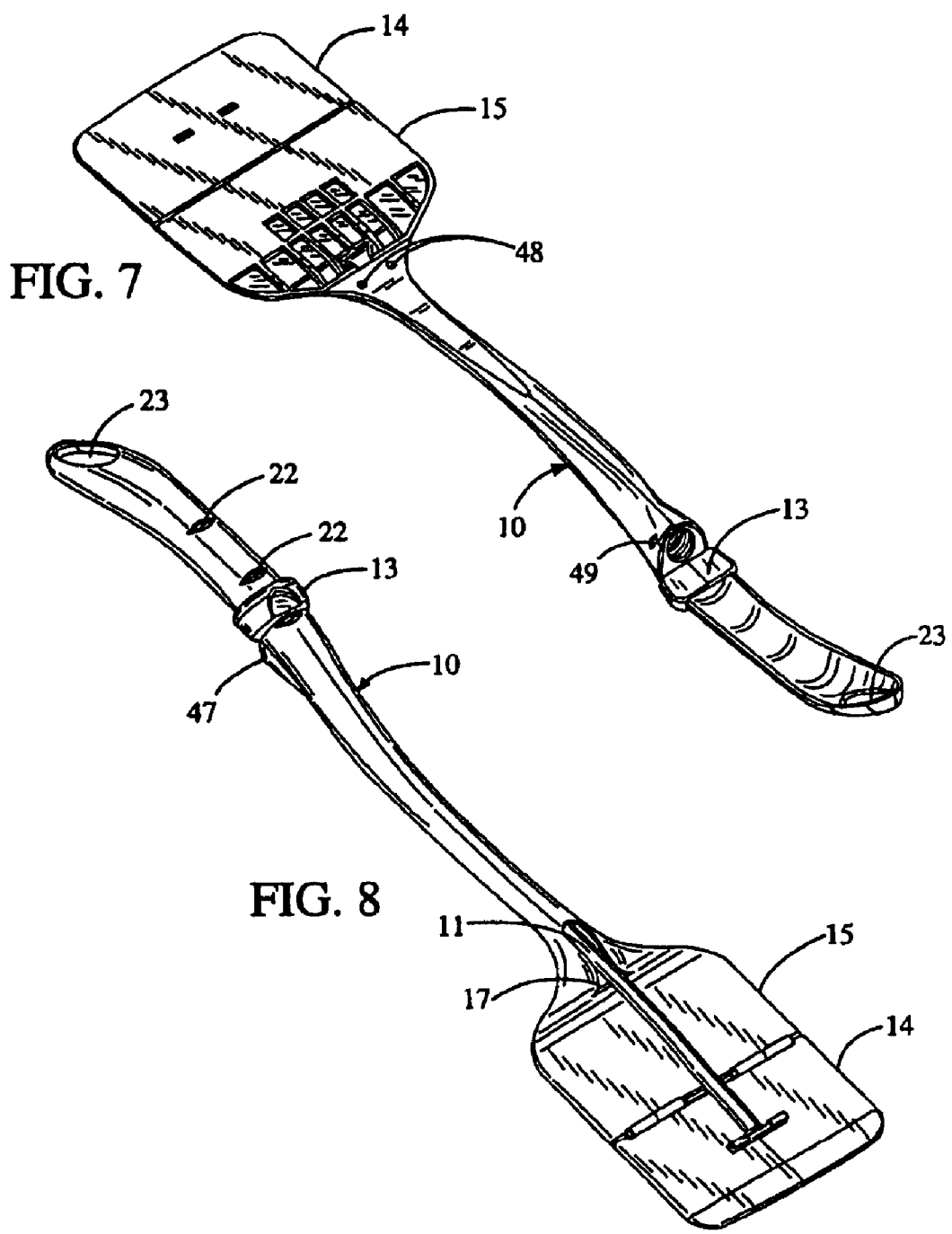

ARTICLE RETRIEVING TOOL

BACKGROUND OF INVENTION

This is a continuation-in-part of U.S. Ser. No. 10/083,742, filed Feb. 27, 2002 is now U.S. Pat. No. 6,564,505 by R. J. Anderson.

This invention relates to devices for eliminating pests and picking up small objects. More particularly, it relates to a flyswatter-type tool with a swatter, a portion of which can be bent to desired angles for reaching under or around the edges of cabinets or other out-of-the-way spots. A pad of adhesive sheets can be attached to the swatter for picking up a variety of articles or the swatter can be used, as is, for killing insects.

The prior art in the field of swatters and devices for retrieving dropped items is voluminous.

Well-known insect swatters of the past Include a variety of designs based on the use of screen wire, e.g., U.S. Pat. No. 537,660 to F. W. Wood and U.S. Pat. No. 1,237,081 to J. L. Mott, Jr. Other perforated swatters use holes, e.g., U.S. Des. 401,304 to Kate L. Hawkins and slots, e.g., U.S. Pat. No. 2,736,129 to N. W. Roop. Since users break the handles or wear out the swatter head, a variety of mechanisms have been created to make repairs. The creativity utilized is depicted in exemplary U.S. Pat. No. 884,213 to F. M. Schmidt, U.S. Pat. No. 2,736,129 cited above; U.S. Pat. No. 2,963,816 to M. E. DeMiller and U.S. Pat. No. 4,905,408 to C. R. Wu et al and U.S. Pat. No. 5,630,290 to B. R. Wade et al.

Another approach to the disposition of small insects and animals includes the use of adhesives, especially where the kill or capture is to be on a ceiling or on the floor adjacent a wall. Typical swatters are shown in a variety of U.S. patents: U.S. Pat. No. 4,653,222 to T. N. Viscosi teaches a typical swatter configuration except that a pad and adhesive papers is seated within swatter head having a rim around the edges at a height which allows the top adhesive sheet to hit the insect, but not the surface on which the insect is resting.

U.S. Pat. No. 5,634,293 to A. V. Mike et al teach a swatter with a slit. A folded member having adhesive on the external folded surface is inserted through the slot with the center of the fold extending to the rear and then opened across the front of the swatter to expose the adhesive-clad inner surfaces. When a pest is adhered, the inner surfaces are again closed for disposal of the entombed pest.

U.S. Pat. No. 6,055,767 to T. D. Carter teaches a one-piece handle/swatter combination with a pad of sheets having the form of the swatter where the pads are made up of sheets with an adhesive on each side for quick adhesion to the swatter.

U.S. Ser. No. 10/083,742 by R. W. Anderson also teaches a variety of devices which describe a number of tools for many of the same uses.

Tongs, at one end of a long handle, are also used for the same purpose. H. E. Baughman, U.S. Pat. Nos. 3,937,512, A. V. Yancy, 2,759,758, C. O. Crow, U.S. Pat. No. 2,469,865, and J. F. Apfel, U.S. Pat. No. 2,279,809 all teach a combination of a handle, trigger, pull rods which combine with the bar positioning handle and pincer elements to open and close pincers. J. T. McFadden, U.S. Pat. No. 3,463,244 teaches the use of a pull bar and slide fitted over the positioning bar.

Types of additional approaches are typified by J. A. McWilliams et al in U.S. Pat. No. 4,653,789. This patent teaches a device with a replaceable sticky cover on one end and a handle on the other end. The unit could be made in a telescoping model and a portion of the handle is designed to enable the user to pick up small items in hard-to-reach sites.

Finally, R. M. Jarosch, U.S. Pat. No. 6,065,787 teaches a sophisticated telescoping handle for picking up objects while standing, utilizing a pad of adhesive sheets attached to the telescoping handle.

The prior art tools are obviously robust and useful but are extremely clunky and are subject to catching on drapes, tablecloths and other objects. They would obviously look out of place in the modern home. They are too heavy, and almost useless for the wheelchair-bound, the elderly and those who operate in cramped spaces.

The tools of this invention are multi-utilitarian, are lightweight, can be used to reach under the edges of cabinets, can be elegant and do not require repetitive trigger or pulling motions. Further, they can be very lightweight which can be of great benefit in cost and convenience to those of the severely handicapped who have trouble picking up objects.

SUMMARY OF INVENTION

The tools of this invention have a handle, a tool head and a control rod. The tool head is made up of a tool extension base and a tool extension with a hinge line between them. The control rod is connected to the tool extension and used to position the tool extension at predetermined angles with respect to the tool extension base by interaction of the control rod with at least one of several stops positioned along the handle.

BRIEF DESCRIPTION OF DRAWINGS

FIG. 2 depicts the bottom surface of the upper handle part.

FIG. 3 provides a view of the inner surface of the lower handle part.

FIG. 5 provides additional details about the tool extension of the upper handle part of FIG. 1.

FIG. 6 provides a perspective view of the positioner of FIG. 1.

FIGS. 7 and 8 portray the lower and upper surfaces of an assembled preferred tool.

DETAILED DESCRIPTION

The preferred model of the invention is described in FIGS. 1–8.

Figure 1:
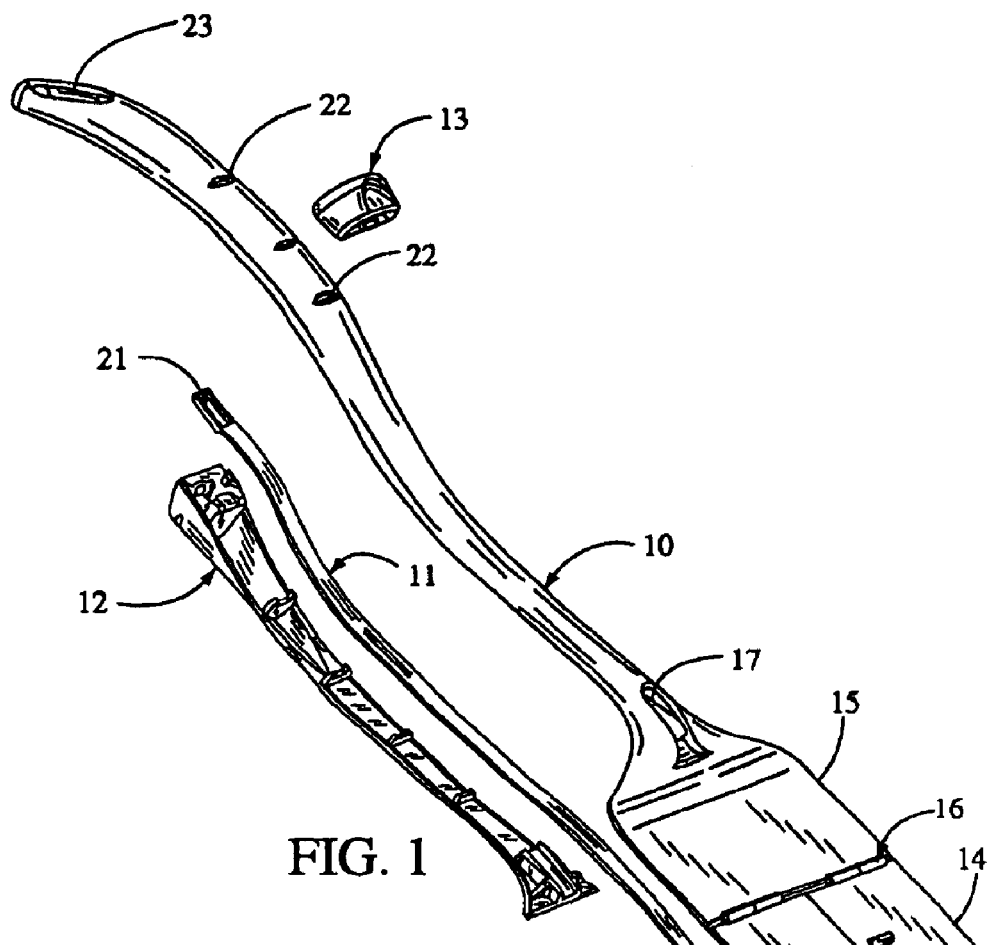
FIG. 1 provides an exploded view of the five major parts of the preferred tool of this invention.

FIG. 1 depicts the major components of the tool of this invention. Subsequent Figures address various aspects of the tool. The tool is made up of upper handle part 10, a control rod 11, a lower handle part 12, a signet ring shaped positioner 13 and a tool extension 14 attached to the tool extension base 15 at the hinge line by hinges 16.

Handle part 10 has a slot 17 through which the control rod 11 extends. Control rod 11 has, at its front end, a "T" extension 18 from which rods 19 extend laterally. The rod 19 slips under hooks 20 and is used to move tool extension 14 to a desired position. When rod 11 is moved toward the opposite end of the upper handle, part 10, e.g., to form a right angle or to form an 180° "wedge.

Rod 11 is passed through slot 17 and attached to signet ring shaped positioner 13 via right angle retainers 42 (See FIG. 6) over which the terminal slot 27 is fitted. Positioner 13 engages positioning stops 22 to hold the tool extension 14 in a predetermined position. A "hanger" hole 23 is positioned adjacent to the end of upper handle as shown.

FIG. 2 depicts the opposite side of the arcuate, upper handle part 10 as shown in FIG. 1. The upper handle part 10 is an arcuate for most of its length and flattens proximate to the tool extension base 15. Screw holes 24 are provided for the attachment of the lower handle part 12. Recesses 25 are shown in this model as they enable the overall weight of the tool to be reduced in a manner that desired flexibility is ensured and overall weight is reduced. Hinge halves 26 are positioned at the edge of tool extension base 15 to interact with tool extension 14 via a hinge pin and mating hinge halves 35 (see FIG. 5).

FIG. 3 provides a view of the inner surface of lower handle part 12 in position for attachment to upper handle part 10 of FIG. 1. It has a threaded hole 27 (not shown) on one end of a size suitable for attachment to a painter's or other extension mechanism on one end and flares outwardly on the other end. The screw holes 24 are drilled within projections 29 and anchor both ends of the lower body part 12 in place. A groove 30 is cut into the top of the front support 31, middle supports 32 and lower handle part base 28.

Figure 4:
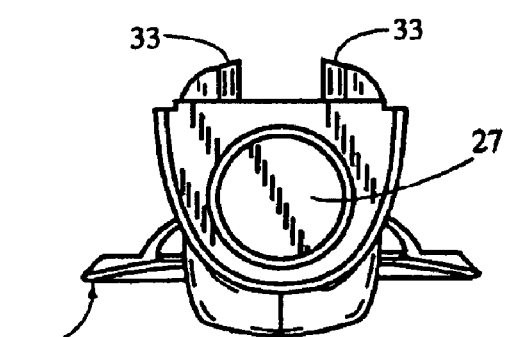
FIG. 4 is an upper end view of part of FIG. 2.

FIG. 4 is an end view of lower handle part 12 showing hole 27 and the projections 29 and 33 containing screw holes 24 (not shown).

FIG. 5 details the tool extension 14, which has tool extension hinge halves 35 and hooks 36, which interact with "T" extension arms 19. Extension 14 slopes laterally from line 37 and tapers to blunt edge 38 from line 39.

Flexible positioner 13 of FIG. 6 has an arcuate upper portion 40, a flat bottom surface 41 which splits near the center point forming two right angle retainers 42. The slot 21 (FIG. 1) of control rod 11 fits over the right angle retainers 42 when they are pressed together. Control rod 11 is then locked in place by retainers 42 when the pressure is released. An orifice 43 is provided in upper portion 40 so that, when pinched from the side, the top of the positioner 13 slides over a stop 22 (FIG. 1) and locks in place when the pressure is released, partially surrounding and being anchored by stop 22. FIGS. 7 and 8 provide lower and upper views of an assembled tool. Screws (not shown) within screw recesses 48 (FIG. 7) indicate where the upper 10 and lower 12 handle parts are connected.

Figure 9:
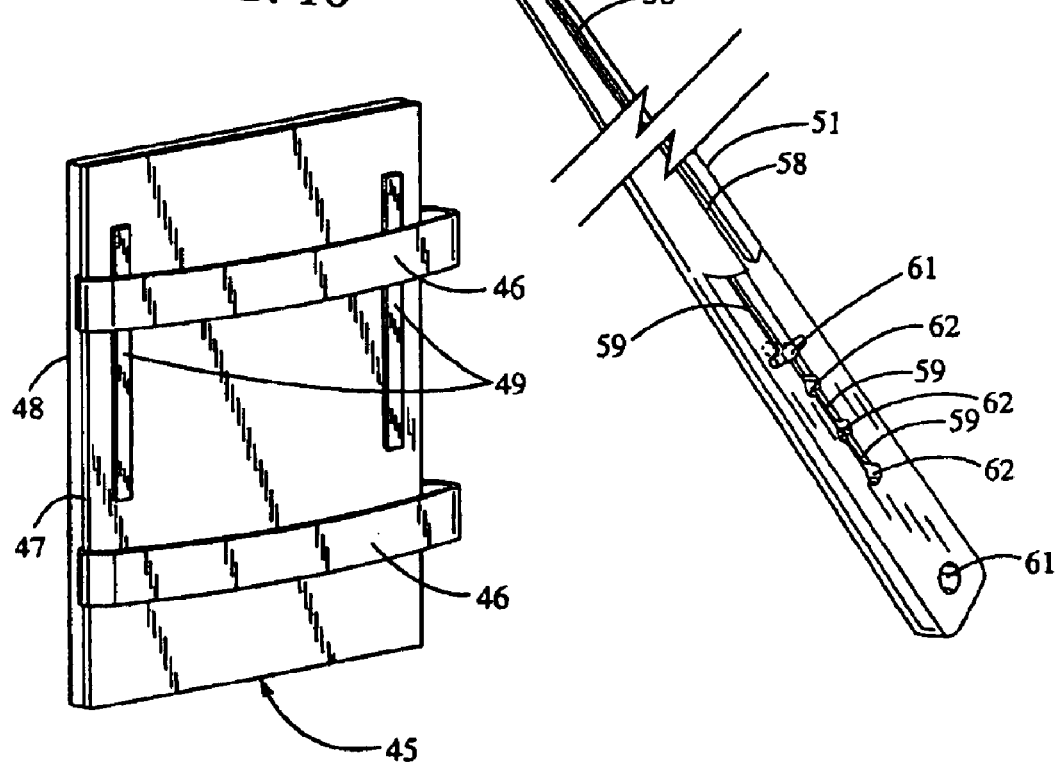
FIG. 9 depicts one form of a pad of adhesive faced sheets for attachment to the "hitting" surface of the tool of FIG. 1.

In FIG. 9, the rear view of pad 45 shows two elastic bands 46 attached to the pad backing 47 to which a pad 48 of adhesive coated sheets is attached. Two well attached spring metal or plastic spring strips 49 are attached to pad backing 47 to ensure a full return (verticalization) of the pad 45 after bends.

Figure 10:
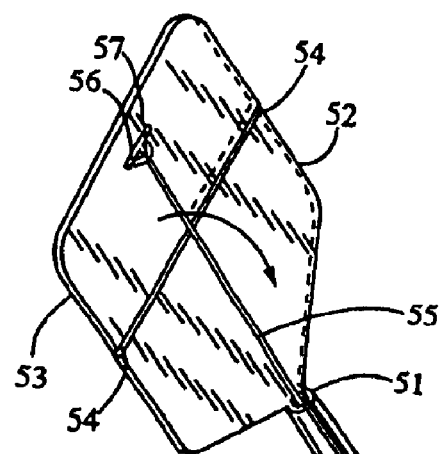
FIG. 10 provides a view of a second model tool.

FIG. 10 provides a perspective view of a model, which has a handle 51 with a tool extension base 52 and tool extension 53. A groove 54 is formed between the flexible plastic base 52 and extension 53 to enable the extension 53 to bend to desired angles. The wire 55 extends, along the base 52, within a deep slot 58 in handle 51 and emerges into a shallow slot 59. The wire 55 in slot 59 is threaded at its end. The upper end of a peg 61 has been screwed onto the threaded wire 55 and inserted into a stop 62 (hole) to position the tool extension 53. The wire 55 fits into a shallow slot 59 to form a substantially smooth handle.

Figure 11:
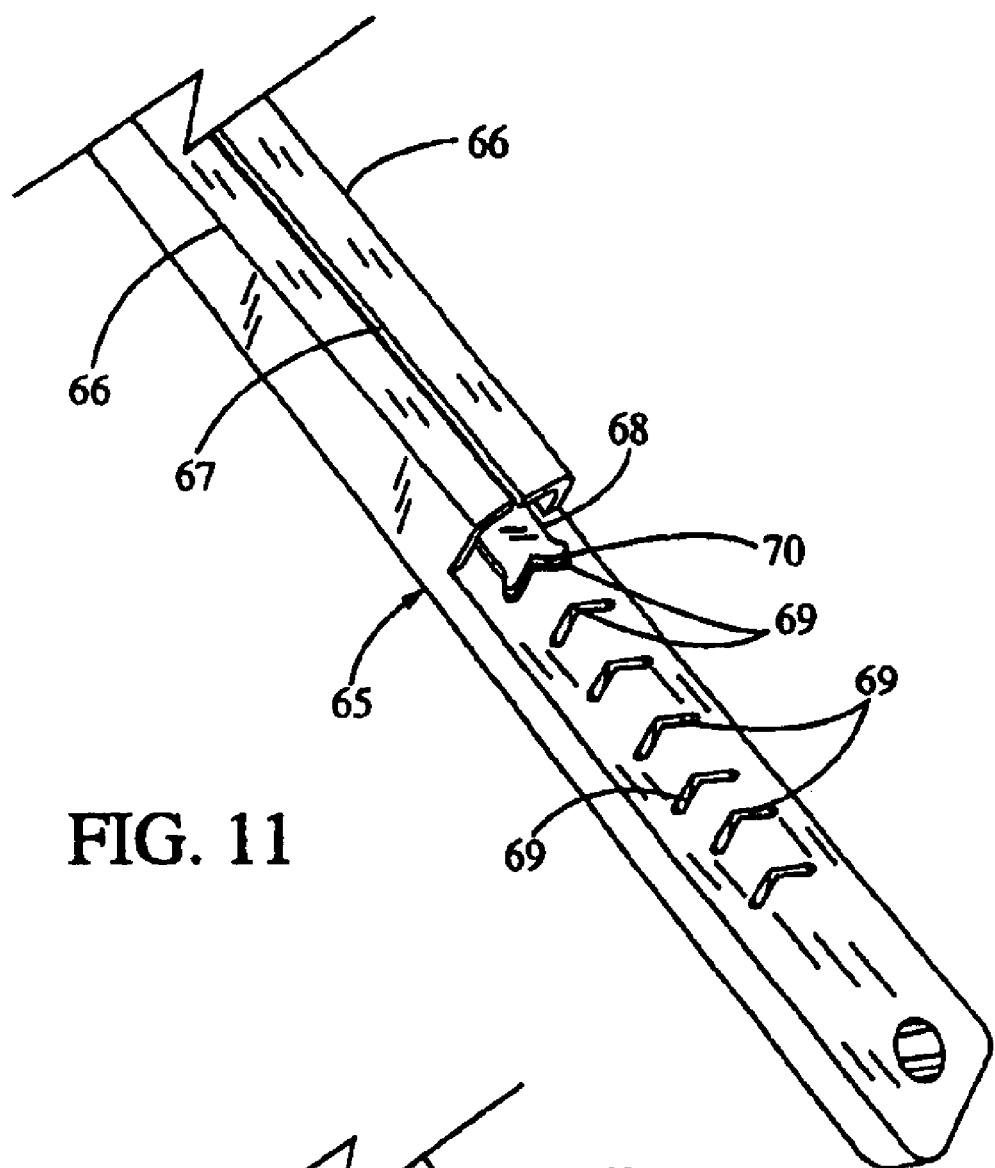
FIG. 11 provides a view of a portion of a handle of a third model of the invention.

FIG. 11 depicts a portion of a handle 65 of a tool of this invention having two right angled cover pieces 66 which form an enclosure with a narrow slot 67 in its upper surface for the insertion or removal of a flat control rod 68. Chevron-shaped recesses in the handle 65 act as stops 69. A projection 70 (see FIG. 12) is inserted into a desired forward angled stop 69 to position the tool extension (not shown) at a desired angle.

Figure 12:
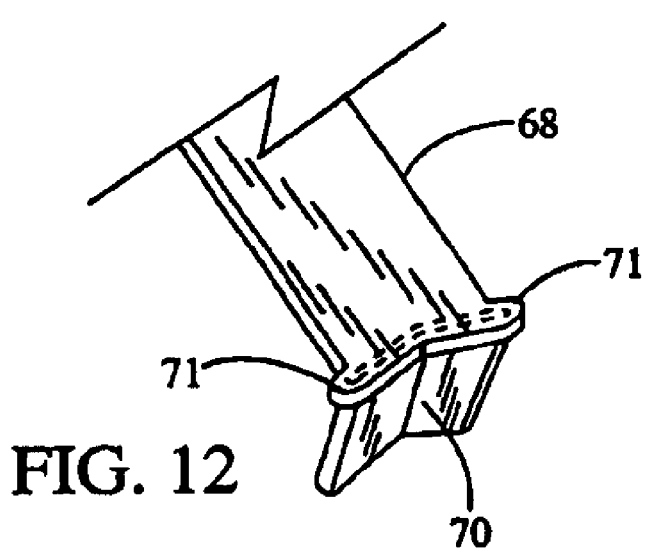
FIG. 12 provides detail showing the interaction between one form of a stop and a control rod.

FIG. 12 provides more details about the fitting of projection 70 into an angled chevron-shaped slot-type stop 69 As indicated by the dashed lines, projection 70 is fused to rod 68. Projection 70 has upwardly bent lifting tabs 71 at its edges which are used to assist in inserting it into slot 69 and removing it therefrom.

GENERAL TEACHING OF THE INVENTION

While the more preferred configurations are described in detail, other forms can be of equal utility.

The tool head can be quite rigid but flexible across the hinge line. This rigidity can be inherent in the materials of construction and/or the design or can be obtained through the addition of springs to the tool head, for example, see the springs of FIG. 9. The control rod can be designed to support the rigidity of the tool head while bending under pressure as it interacts with a slot, e.g., slot 17 of FIG. 1. On the other hand, the control rod can be a chain where the inherent rigidity of the tool head permits its use without the need for additional support from the control rod.

The combination of rigidity and flexibility needed to meet the differing requirements of various tool usage requires differing approaches to the design of the tools. For example, the strength requirements for the combination making up the tool head and control rod will vary with the materials used. Thus, where hinges are used at the bend line, they can be used in combination with hinge springs. Where hinges are not used and the tool extension base and tool extension are joined across the bend line, the flexibility necessary for the expected tool operation can be supplied by decreasing the thickness of the material of construction at the bend line to effect the necessary flexibility.

Where a pad with adhesive-faced sheets is to be used with the tool head, the tool head handle, rod, stop and other configuration requirements, strength, resilience and other changes, must be taken into account to ensure minimum problems over the designed life expectancy of the tool. Co-pending application Ser. No. 10/083,742 provides additional insights into the design of the handle, tool head, control rods and stops, e.g., hooks on the handle, or hook and loop fasteners.

Springs can be added to the tool head to ensure desired rigidity between the base and the extension. Where added, more flexible "rods" can be utilized, i.e., wires or chains, because the strength of the "rods" may not be needed to establish desired tool head rigidity.

What is claimed is:

1. In a tool comprising a handle, a tool head, a control rod, and a plurality of stops on or in the handle; the improvement comprising:

said tool head having a tool extension base connected to a tool extension across a hinge line, said control rod on one end rotatably attached to said tool extension and said control rod on an opposing end retained by a positioning stop on the handle, said control rod is positioned within a hole running through at least a part of the handle, said control rod being operational to rotate said tool extension to a selectably fixed angle between ninety (90) degrees and one hundred eighty (180) degrees with respect to said tool extension base.

2. In a tool comprising a handle, a tool head, a control rod, and a plurality of stops on or in the handle; the improvement comprising:

said tool head having a tool extension base connected to a tool extension across a hinge line, said control rod on one end rotatably attached to said tool extension and said control rod on an opposing end retained by a positioning stop on the handle, said control rod is positioned within a partially covered groove in at least a part of the handle, said control rod being operational to rotate said tool extension to a selectably fixed angle between ninety (90) degrees and one hundred eighty (180) degrees with respect to said tool extension base.

3. A tool comprising an upper handle part having on one end a tool head and, intermediate its length, a plurality of stops and, proximate to said tool head, a slot; said tool head having a tool extension base connected to a tool extension positioned across a rotation permitting fuse line having hooks for connection to a control rod;

said control rod being rotatably connected to said hooks inserted through said slot in said upper handle and connected to a positioner on an other end; a lower handle part, complementary in shape to a side of said upper handle part, opposite to said stops, attached to said upper handle part and enclosing an intermediate portion of said control rod and said positioner, encircling said upper handle part which is connected to said other end of said control rod opposite to a connection to said hooks and which interacts with at least one of said stops to fix the position of said control rod and therethrough fix the position of said tool extension for usage.

4. In a tool comprising a handle, a tool head, a control rod, and a plurality of stops on or in said handle; the improvement comprising:

said tool head having a tool extension base connected to a tool extension across a hinge line, said control rod on one end rotatably attached to said tool extension and said control rod on an opposing end retained by a positioning stop on the handle, said control rod is one of a flexible cord and chain, said control rod being operational to rotate said tool extension to a selectably fixed angle between ninety (90) degrees and one hundred eighty (180) degrees with respect to said tool extension base.

5. In a tool comprising a handle, a tool head, a control rod, and a plurality of stops on or in said handle; the improvement comprising:

said tool head having a tool extension base connected to a tool extension across a hinge line, said control rod on one end rotatably attached to said tool extension and said control rod on an opposing end retained by a positioning stop on said handle, said stop is one of a hole and a slot, said control rod being operational to rotate said tool extension to a selectively fixed angle between ninety (90) degrees and one hundred eighty (180) degrees with respect to said tool extension base.

6. In a tool comprising a handle, a tool head, a control rod, and a plurality of stops on or in said handle; the improvement comprising:

said tool head having a tool extension base connected to a tool extension across a hinge line, said control rod on one end rotatably attached to said tool extension and said control rod on an opposing end retained by a positioning stop on said handle, said control rod is positioned within a partially enclosing slot, said control rod being operational to rotate said tool extension to a selectably fixed angle between ninety (90) degrees and one hundred eighty (180) degrees with respect to said tool extension base.

7. The tool claim 3 wherein of said stops are a plurality of ridges.

8. The tool of claim 3 wherein said stops are complementary to at least one recess in said positioner.

9. The tool of claim 3 wherein said lower handle part most proximate to said positioner encloses a threaded hole.

10. The tool of claim 3 wherein said upper handle part is concave.

11. The tool of claim 3 wherein said upper handle part is curved along its length.

12. The tool of claim 3 further including an attached pad of sheets having adhesive on their sides opposite to a pad backing.

* * * * *